(12) United States Patent
Mauch

(10) Patent No.: US 9,452,477 B2
(45) Date of Patent: Sep. 27, 2016

(54) CLAMPING DEVICE

(71) Applicant: Narr Beteiligungs GmbH, Kirchheim/Teck (DE)

(72) Inventor: Peter Mauch, Koenigsheim (DE)

(73) Assignee: NARR BETEILIGUNGS GMBH, Kirchhelm/Teck (DE)

(*) Notice: Subject to any disclaimer, the term of this patent is extended or adjusted under 35 U.S.C. 154(b) by 235 days.

(21) Appl. No.: 14/245,059

(22) Filed: Apr. 4, 2014

(65) Prior Publication Data

US 2015/0021864 A1 Jan. 22, 2015

(30) Foreign Application Priority Data

Jul. 22, 2013 (EP) .................... 13177415

(51) Int. Cl.
*B23B 31/20* (2006.01)
(52) U.S. Cl.
CPC ...... *B23B 31/201* (2013.01); *B23B 2231/2005* (2013.01); *B23B 2240/04* (2013.01); *Y10T 279/17316* (2015.01); *Y10T 279/17341* (2015.01)
(58) Field of Classification Search
CPC ............... B23B 31/20; B23B 31/201; B23B 2231/2005; B23B 2240/04; Y10T 279/17316; Y10T 279/17341; Y10T 279/17418
See application file for complete search history.

(56) References Cited

U.S. PATENT DOCUMENTS

| | | | | |
|---|---|---|---|---|
| 1,535,048 A * | 4/1925 | Schumer | ............... | B23B 31/207 279/155 |
| 2,562,455 A * | 7/1951 | Gridley | ................ | B23B 31/207 279/157 |
| 2,644,929 A * | 7/1953 | Kumpf | ................ | H02G 15/085 174/75 C |
| 2,767,564 A * | 10/1956 | Green | .................... | B23B 31/08 279/141 |
| 3,583,714 A * | 6/1971 | Weltzer | ................ | B23B 31/202 279/136 |
| 4,655,631 A * | 4/1987 | Mitchell | ............... | B23B 29/046 279/904 |
| 4,784,543 A * | 11/1988 | Mitchell | ............... | B23B 29/046 279/91 |
| 4,836,706 A * | 6/1989 | Mitchell | ............... | B23B 29/046 403/24 |
| 5,133,565 A * | 7/1992 | Schmidt | ............. | B23B 31/4066 279/2.04 |
| 5,160,150 A * | 11/1992 | Schmidt | ................ | B23B 31/202 279/46.7 |
| 5,372,055 A * | 12/1994 | Kelly | ................ | B25B 13/5016 279/43.2 |

FOREIGN PATENT DOCUMENTS

BE 106231 A * 5/1917 ........... B23B 31/207

\* cited by examiner

*Primary Examiner* — Eric A Gates
(74) *Attorney, Agent, or Firm* — FisherBroyles, LLP; Robert Kinberg

(57) ABSTRACT

A clamping device for clamping a work piece includes a chuck, a collet positioned inside the chuck, and a bayonet fastener operatively arranged so that the collet is fastenable in the chuck and is removable from the chuck solely by manual operation of the bayonet fastener without the use of auxiliary tools.

7 Claims, 3 Drawing Sheets

CLAMPING DEVICE

CROSS-REFERENCE TO RELATED APPLICATION

This application claims the priority of European Patent Application EP 13 177 415.0, filed on Jul. 22, 2013, and German Patent Application DE 20 2013 103 278.6, filed on Jul. 22, 2013, the subject matter of which is incorporated herein by reference.

BACKGROUND OF THE INVENTION

The invention relates to a clamping device comprising a chuck and a collet positioned inside the chuck.

Clamping devices of this type are generally used for the clamping in of a work piece. The clamping device thus comprises a chuck and a collet which is positioned inside the chuck. The collet is used to fasten the respective work piece. For this, the collet is advantageously operated with the aid of a pull rod which is in particular moved, meaning displaced, with the aid of a drive unit. The collet in this case preferably consists of several collet segments which can carry out the adjustment movements and thus can clamp in the work piece and also release it again.

If the clamping device is to be used for the clamping of different types of work pieces, the collet on the chuck for the clamping device must be replaced. One problem with the known clamping devices is that the replacement requires the use of auxiliary tools which are necessary to loosen the collect to be replaced on the chuck, so that it can be removed. The auxiliary tools must be used in a corresponding manner to secure the new collet inside the chuck.

The use of auxiliary tools represents an undesirable additional structural expenditure for embodying the clamping device. A further disadvantage is that the auxiliary tools form loose parts which must be stored separately. The auxiliary tools frequently are not available if a collet on the chuck must be replaced, which results in additional expenditure for conducting a search or for procuring the auxiliary tool.

SUMMARY OF THE INVENTION

It is therefore an object of the invention to provide a clamping device of the aforementioned type which has a high functionality with low structural expenditure.

The above and other objects are accomplished according to an embodiment of the invention, wherein there is provided a clamping device for clamping a work piece, comprising: a chuck; a collet positioned inside the chuck; and a bayonet fastener operatively arranged so that the collet is fastenable in the chuck and is removable from the chuck solely by manual operation of the bayonet fastener without the use of auxiliary tools.

One essential advantage of the clamping device according to the invention is that the collet in the chuck can be installed without the use of auxiliary tools and, if necessary, can also be removed from the chuck. In order to secure the collet in the bayonet fastener, an operator only needs to manually operate the bayonet fastener.

The bayonet fastener forms an integral component of the clamping device and is thus attached permanently to the clamping device. A single operator can easily and quickly operate the bayonet fastener, so that the time for the installation and removal of the collet can be kept very low.

According to an embodiment of the invention, the bayonet fastener may include an activation ring that can be operated manually, as well as with a bayonet ring that is operatively connected to the activation ring and functions to secure the collet in the chuck.

The bayonet fastener embodied in this way has a structurally simple design. The components of the bayonet fastener can be integrated into the clamping device without resulting in a significant increase in the structural size.

The activation ring and the bayonet ring may be arranged concentrically on the chuck, wherein the bayonet ring may be positioned inside the activation ring. Pins may be provided which radially project inwardly from the inside of the activation ring and may engage in bores in the bayonet ring, thereby transmitting a rotational movement of the activation ring to the bayonet ring.

By rotating the activation ring, the bayonet ring can be moved between a closed position in which the bayonet ring secures the collet in the chuck and an open position in which the bayonet ring releases the collet from the chuck.

The activation ring may be positioned on the outside of the clamping device and can thus be turned easily by an operator. This rotational movement of the activation ring may be transmitted by the pins to the bayonet ring which then locks the collet in place and/or releases the collet from the chuck. As a result, a structurally easy and simultaneously robust design of the bayonet fastener may be realized.

The position of the collet remains unchanged during the activation of the bayonet fastener, which is achieved with an anti-locking device that secures the collet in a fixed, radial position inside the chuck.

According to one embodiment of the invention, brackets are provided on a front face of the bayonet ring, which extend radially toward the inside and into a cavity enclosed by the bayonet ring, wherein these brackets function to secure the collet. Furthermore provided are webs that end at the outer surface of the collet, are separated by grooves, and form a ring-shaped arrangement. In the closed position of the bayonet ring, the brackets of the bayonet ring fit against the webs and thus connect the collet to the chuck. In the opened position of the bayonet ring, the brackets are located in the region of the grooves of between the webs of the collet, so that the collet can be removed from the chuck. The webs and grooves usefully adjoin the front face of the collet by which the collet is inserted into the chuck.

In this way, a particularly simple and yet reliable locking mechanism is obtained which makes it possible to secure the collet in the chuck and release it again as needed.

The collet is composed of several identical collet segments, wherein respectively adjacent collet segments are connected via an elastic element that extends in an axial direction across the collet.

The elastic elements generally are preforms that are composed of rubber mixtures. These elastic elements in general make possible a relative movement of the individual collet segments. The elastic elements furthermore form sealing elements, meaning the elastic elements meet a dual function.

The inventive design of this arrangement achieves that during the closing of the bayonet fastener, the collet segments are moved over their complete length in a uniform manner in the radial direction. The elastic elements are compressed uniformly over their complete length.

This represents a considerable advantage as compared to the known clamping devices where the collet must be mounted in and/or dismounted from the chuck with the aid of auxiliary tools. The collet segments of known devices carry out tilting movements during the mounting of the collet, as a result of which the elastic elements that connect the collet segments are not compressed uniformly. Rather, the elastic elements are locally compressed very strongly, meaning the elastic elements are subjected to extremely high stresses at those locations, thereby resulting in increased wear of the elastic elements and an undesirable reduction in the service life of the collet. This disadvantage is avoided with the arrangement according to our invention since the bayonet fastener causes a uniform, radial movement of the collet segments which results in a uniform pressure load on the elastic elements.

According to one embodiment, a locking device is provided for locking in place the bayonet fastener once the collet has been fastened inside the chuck with the aid of the bayonet fastener.

In particular, the locking device comprises a mechanism to secure the position of the activation ring when the bayonet ring is in the closed position.

With this locking device, it is achieved that the bayonet fastener is not released in an uncontrolled manner during the operation of the clamping device. A locking device of this type can be realized by using a spring element to generate spring forces that act in an axial direction of the clamping device upon the activation ring and keep at least one locking element, provided on the activation ring, in an associated receptacle of the chuck. To activate the bayonet fastener, the activation ring is initially moved in axial direction and can then be rotated. Following the activation with the activation ring, the locking element again automatically engages in an associated receptacle, so that the bayonet fastener is secured.

BRIEF DESCRIPTION OF THE DRAWINGS

These and other features and advantages of the invention will be further understood from the following detailed description of embodiments with reference to the accompanying drawings, showing in.

DETAILED DESCRIPTION OF THE PREFERRED EMBODIMENTS

Figure 1:
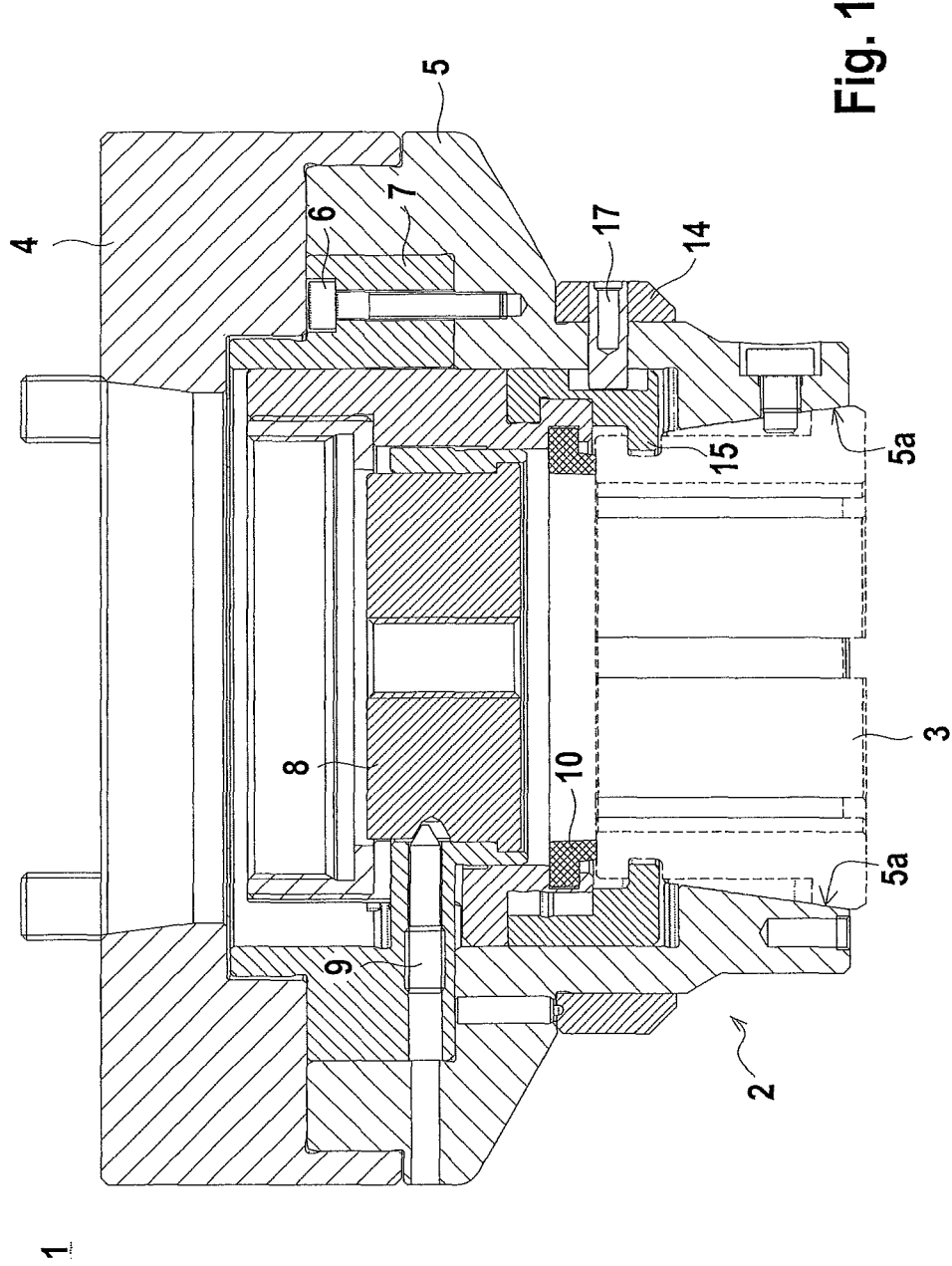
FIG. 1 A partial sectional view of an exemplary embodiment of the clamping device according to the invention, with a bayonet fastener for securing a collet in a clamping device.

FIG. 1 contains a partial sectional view of an exemplary embodiment of a clamping device 1 according to the invention which is used for the clamping of a work piece. FIG. 1 shows a chuck 2 and a collet 3 for the clamping device 1. Not shown is the mechanism for activating the collet 3 that is positioned in the chuck 2 and which functions to move the collet 3 and thus to clamp in or release the work piece, which is also not shown herein. This mechanism can comprise a drive unit, in a manner known per se, for generating a linear movement of a pull rod which serves to activate the collet 3. Components of the arrangement shown in FIG. 1 are shown as separate components in FIG. 2.

Figure 2:
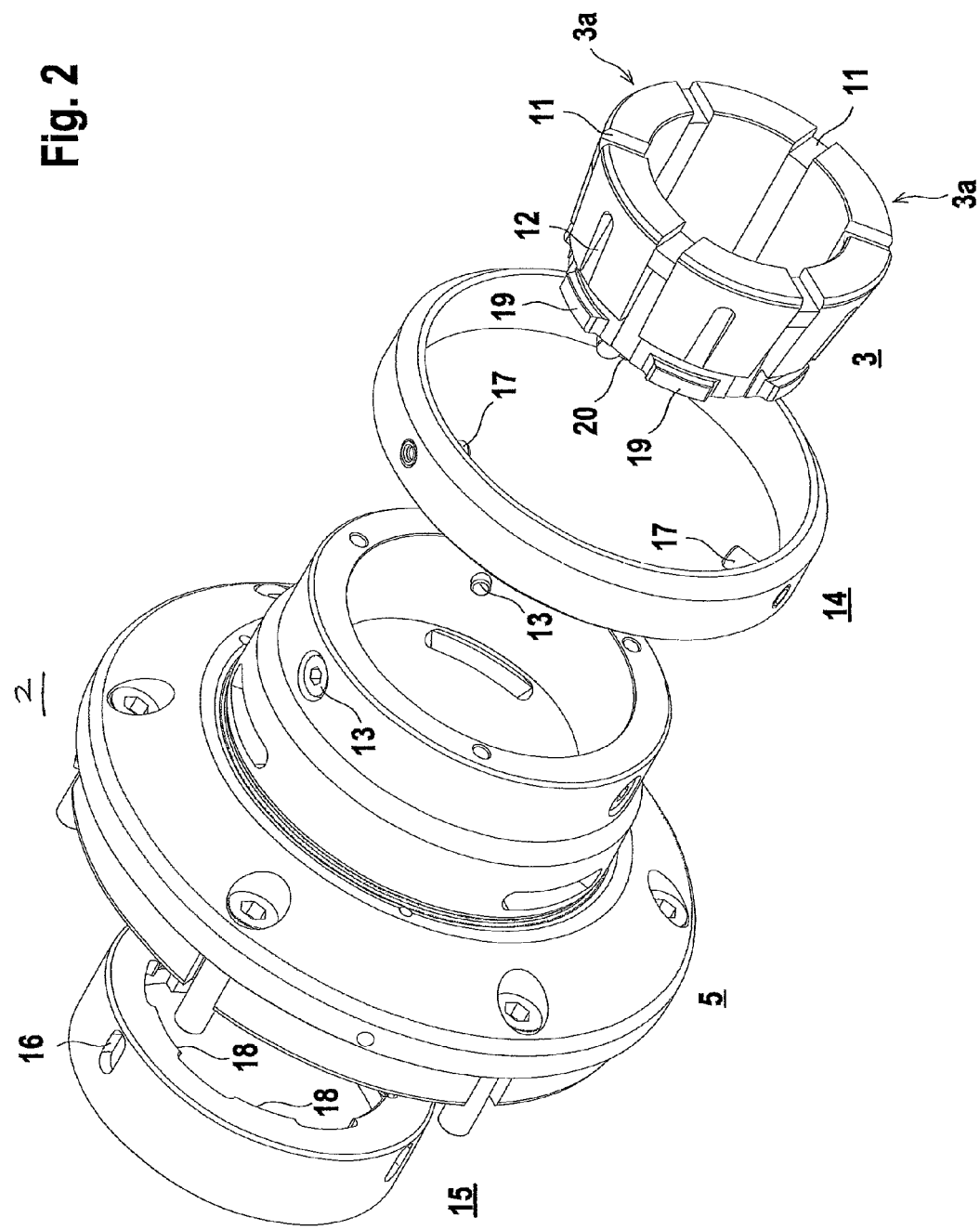
FIG. 2 An exploded view of the individual components of the clamping device shown in FIG. 1.

As can be seen in FIG. 1, the chuck 2 of the clamping device 1 is composed of a chuck flange 4 and a chuck body 5 which is also shown separately in FIG. 2. The chuck flange 4 and the chuck body 5 are connected via cap screws 6 while a stopper holder 7, which is positioned between the chuck flange 4 and the chuck body 5, is screwed with the aid of cap screws 6 to the chuck body 5.

A reversible stop 8 is positioned on the inside of the chuck 2 and is secured in place with a locking pin 9. The reversible stop 8 functions as a replaceable reference element which, together with axial stops, makes it possible to adapt to different work pieces positioned in the collet 3.

The chuck body 5 comprises an opening on the front which is delimited by conically extending contact surfaces 5a into which the collet 3 is inserted. FIG. 1 illustrates the collet 3 that is inserted into this opening, wherein it is provided with a sealing ring 10 at the back edge that is inserted into the opening and is positioned inside the chuck body 5. This sealing ring protects a locking area in which the collet 3 is secured inside the chuck 2 against penetrating shavings or other types of contamination.

As can be seen in particular in FIG. 2, the collet 3 is composed of six identically embodied collet segments 3a, wherein respectively adjacent collet segments 3a are connected by elastic elements 11 that extend in an axial direction of the collet 3. The elastic elements 11 are embodied as preforms that are composed of rubber mixtures. These elastic elements 11 form elastic couplings between the collet elements 3a, so that the elastic elements 11 are compressed when pressure forces act upon the surface area of the collet 3, so that the collet segments 3a can be pushed together in the radial direction.

The collet 3 is positioned non-rotating inside the chuck body 5. As a means for preventing rotation, grooves 12 which extend the axial direction are provided in the outside surface of the collet 3. In the present case, a groove 12 is provided on each collet segment 3a. Cap screws 13 that are positioned in the chuck body 5 engage in these grooves 12 and ensure a non-rotating positioning of the collet 3 in the chuck body 5.

According to the invention, the collet 3 is secured toolless with the aid of a bayonet fastener and thus without any auxiliary tools inside the chuck 2. The bayonet fastener comprises an activation ring 14, positioned on the outside of the chuck body 5, which can be activated, meaning rotated, by an operator. The bayonet fastener furthermore comprises a bayonet ring 15, arranged concentric to and within the activation ring 14, which functions to lock in place or unlock the collet 3.

The bayonet ring 15 is provided on its outside surface with slots 16 in which pins 17 engage that are positioned on the activation ring 14 and project radially inward from its inside surface. A rotational movement of the activation ring 14 is thus transmitted to the bayonet ring 15.

To secure the collet 3 inside the chuck 2, the bayonet ring 15 is provided with brackets 18 on a front face which extend in the radial direction into the cavity enclosed by the bayonet ring 15. The brackets 18 are embodied identically and are respectively separated by intermediate spaces. The intermediate spaces are also formed identically, so that the brackets 18 are positioned equidistance in a circumferential direction of the bayonet ring 15.

Corresponding to the brackets 18 on the bayonet ring 15, webs 19 are provided in the back region of the collet 3 which leads into the chuck 2, wherein these webs end at the outer surface of the collet 3 as seen in radial direction. Six webs 19 which are separated by grooves 20 are provided in the present case, wherein respectively one web 19 is provided on each collet segment 3a. The webs 19 are embodied identically. The grooves 20 between the webs 19 are also embodied identically, so that the webs 19 are arranged equidistant in the circumferential direction of the collet 3. The lengths of the webs 19, meaning the extensions in circumferential direction, are adapted to the lengths of the brackets 18 for the bayonet ring 15.

By rotating the activation ring 14 by 30°, the bayonet ring 15 can be moved between an opened position and a closed position. During the insertion of the collet 3 into the chuck 2, the bayonet ring 15 is in the opened position. As soon as the collet 3 has been inserted to the desired position inside the chuck 2, the brackets 18 of the bayonet ring 15 are located in the region of the grooves 20 because the bayonet ring 15 is in the opened position. To secure the collet 3 inside the chuck 2, the activation ring 14 is then rotated by 30° until the bayonet ring 15 is in the locked position. In the closed position, the brackets 18 of the bayonet ring 15 are positioned on the tops of the webs 19 on the collet 3 and thus prevent the collet 3 from being removed from the chuck 2. If the collet 3 is to be removed once more from the chuck 2, the bayonet ring 15 is again moved to the opened position. The removal of the collet 3 can be aided by using a spring or in general a spring mechanism.

Figure 3:
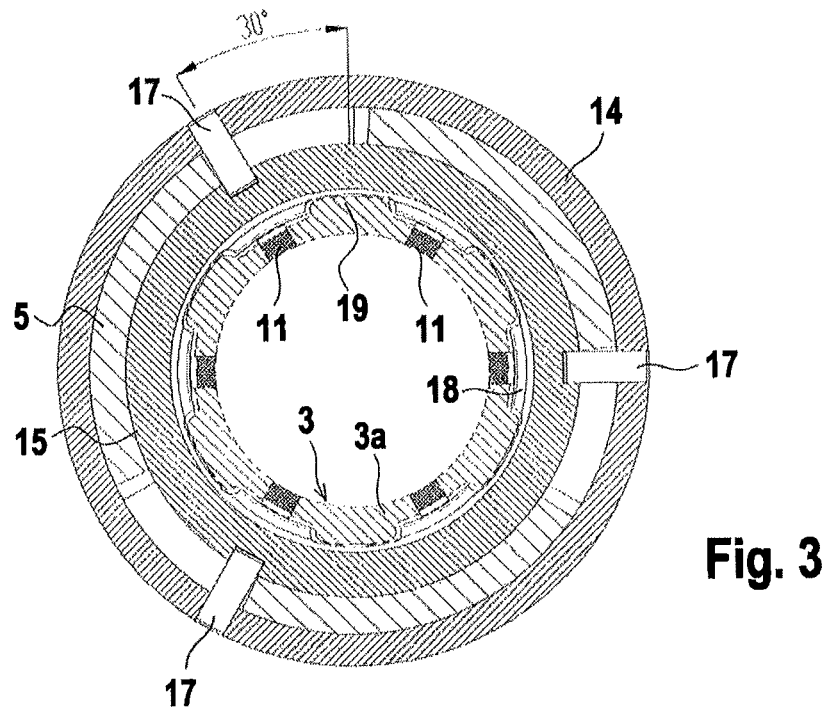
FIG. 3 A sectional view of the clamping device according to FIG. 1 with the bayonet fastener in the opened position.
Figure 4:
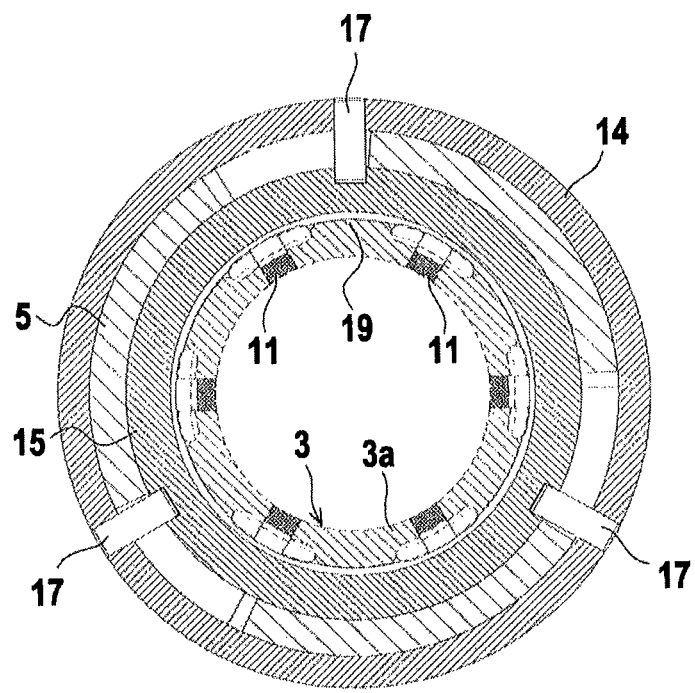
FIG. 4 A sectional view of the clamping device according to FIG. 1 with the bayonet fastener in the closed position.

The sectional view according to FIG. 3 shows the bayonet ring 15 in the opened position while the sectional view according to FIG. 4 shows the bayonet ring 15 in the closed position. As can be seen in FIG. 3, the brackets 18 on the bayonet ring 15 are in the opened position, in the region of the grooves 20 between the webs 19 on the collet 3, thus covering some of the elastic elements 11. With the closed position shown in FIG. 4, the brackets 18 are pushed in front of the webs 19 and are therefore no longer visible in FIG. 4, but the elastic elements 11 are now exposed.

The invention has been described in detail with respect to various embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A clamping device for clamping a work piece, comprising:
    a chuck;
    a collet positioned inside the chuck; and
    a bayonet fastener operatively arranged so that the collet is fastenable in the chuck and is removable from the chuck solely by manual operation of the bayonet fastener without the use of auxiliary tools, wherein the bayonet fastener includes a manually operated activation ring and a bayonet ring operatively connected to the activation ring for securing the collet to the chuck, wherein the activation ring is rotatable and is operatively arranged so that rotation of the activation ring moves the bayonet ring between a closed position in which the bayonet ring secures the collet on the chuck and an opened position in which the bayonet ring releases the collet on the chuck, and wherein the bayonet ring has spaced apart radial grooves and the clamping device further includes pins projecting in a radially inward direction from inside the activation ring to engage in the radial grooves of the bayonet ring to transmit a rotational movement of the activation ring to the bayonet ring.

2. The clamping device according to claim 1, wherein the activation ring and the bayonet ring are arranged concentrically on the chuck, and wherein the bayonet ring is arranged inside the activation ring.

3. The clamping device according to claim 1, wherein the bayonet ring has one front face including brackets which extend radially toward an inside into a cavity enclosed by the bayonet ring and which are operative to secure the collet.

4. The clamping device according to claim 3, wherein the collet includes webs ending at an outer surface of the collet in a radial direction and which are separated by grooves to form a ring-shaped arrangement, and wherein in the closed position of the bayonet ring the brackets of the bayonet ring rest against the webs thereby securing the collet inside the chuck, and in the opened position of the bayonet ring the brackets are located in regions of the grooves so that the collet is removable from the chuck.

5. The clamping device according to claim 4, wherein the webs and the grooves adjoin a front face of the collet by which the collet is inserted into the chuck.

6. The clamping device according to claim 1, wherein the collet comprises a plurality of identical collet segments and a plurality of axially extending elastic elements that respectively connect adjacent collet segments.

7. The clamping device according to claim 6, wherein, during the closing of the bayonet fastener, the collet segments move uniformly in the radial direction over the complete length and the elastic elements are compressed uniformly over the complete length.

* * * * *